United States Patent
Takiuchi et al.

(10) Patent No.: US 7,819,246 B2
(45) Date of Patent: Oct. 26, 2010

(54) RUST PREVENTIVE PACKAGE CONTAINING BEARING FOR MACHINE TOOL AND AND RUST PREVENTIVE PACKAGING METHOD

(75) Inventors: Hiroshi Takiuchi, Kuwana (JP); Tadayoshi Yonezawa, Osaka (JP)

(73) Assignee: NTN Corporation, Osaka (JP)

( * ) Notice: Subject to any disclaimer, the term of this patent is extended or adjusted under 35 U.S.C. 154(b) by 175 days.

(21) Appl. No.: 11/795,507

(22) PCT Filed: Jan. 17, 2006

(86) PCT No.: PCT/JP2006/300489

§ 371 (c)(1),
(2), (4) Date: Jul. 18, 2007

(87) PCT Pub. No.: WO2006/077810

PCT Pub. Date: Jul. 27, 2006

(65) Prior Publication Data

US 2008/0139420 A1  Jun. 12, 2008

(30) Foreign Application Priority Data

Jan. 21, 2005  (JP)  ............................. 2005-014353

(51) Int. Cl.
*B65D 85/58* (2006.01)
*F16C 33/19* (2006.01)
*F16C 33/00* (2006.01)
*C10M 169/00* (2006.01)
*C10M 101/00* (2006.01)

(52) U.S. Cl. ........................ 206/318; 508/100; 384/625

(58) Field of Classification Search .................. 508/100; 384/625; 206/318

See application file for complete search history.

(56) References Cited

U.S. PATENT DOCUMENTS

| 2,643,176 | A | * | 6/1953 | Wachter et al. | ............. | 162/160 |
| 3,034,907 | A | * | 5/1962 | Kleemann et al. | ......... | 106/14.31 |
| 4,464,275 | A | * | 8/1984 | Yasui | .......................... | 508/310 |
| 6,299,356 | B1 | * | 10/2001 | Okamura et al. | ............ | 384/114 |
| 2003/0049986 | A1 | * | 3/2003 | Qureshi et al. | ............. | 442/221 |
| 2004/0234790 | A1 | * | 11/2004 | Smith et al. | ................. | 428/457 |
| 2005/0178500 | A1 | * | 8/2005 | Chevrette et al. | ........... | 156/291 |

FOREIGN PATENT DOCUMENTS

JP  59-221267  12/1984

(Continued)

OTHER PUBLICATIONS

International Preliminary Report on Patentability issued in corresponding International Application No. PCT/JP2006/300489, mailed on Aug. 2, 2007.

(Continued)

*Primary Examiner*—Glenn A Caldarola
*Assistant Examiner*—Pamela Weiss

(57) ABSTRACT

A rust preventive package to contain a bearing used for a machine tool includes a lubricant oil which is used when the bearing is operated, a vaporizable rust preventive sheet wrapped around the bearing, and a box. A method of packaging a bearing used in a machine tool includes applying a lubricant oil which is used when the bearing is operated and wrapping a vaporizable rust preventive sheet around the bearing.

9 Claims, 2 Drawing Sheets

FOREIGN PATENT DOCUMENTS

| | | |
|---|---|---|
| JP | 62-25042 | 2/1987 |
| JP | 63-67274 | 3/1988 |
| JP | 06-247436 | 6/1994 |
| JP | 10086966 A * | 4/1998 |
| JP | 3028966 | 2/2000 |
| JP | 2003-176832 | 6/2003 |
| JP | 2003176382 A * | 6/2003 |
| JP | 2003-312748 | 11/2003 |

OTHER PUBLICATIONS

European Office Action dated Mar. 30, 2010 and issued in corresponding European Patent Application 06 711 769.1.

* cited by examiner

RUST PREVENTIVE PACKAGE CONTAINING BEARING FOR MACHINE TOOL AND AND RUST PREVENTIVE PACKAGING METHOD

CROSS REFERENCE TO RELATED APPLICATIONS

This application is based on and claims priority to International Application No. PCT/JP2006/300489 filed Jan. 17, 2006, and Japanese Application No. 2005-014353 filed Jan. 21, 2005, the disclosures of which are hereby incorporated herein by reference.

FIELD OF THE INVENTION

The present invention relates to a rust preventive package containing a bearing for a machine tool such as, for example, a bearing which is used to support a machine tool spindle that requires a high speed rotation and a high precision, particularly the bearing for the machine tool of a kind which is a precision bearing lubricated with an oil such as, for example, an air oil or oil mist, and also to a rust preventive packaging method therefor.

BACKGROUND ART

It has hitherto been a general practice for a precision bearing for a machine tool that the bearing is allowed a rust preventive oil to be applied after the cleansing of the bearing, then wrapped with a film-like vinyl sheet and finally packaged in a box made of, for example, cardboard. When the bearing is ready to be used, it is necessary to remove the rust preventive oil applied to the bearing and, therefore, the bearing must be cleansed.

In the practice of the method of lubricating the precision bearing of a kind used in supporting the machine tool spindle, an extremely small quantity of lubricant oil such as an air oil lubricant (oil and air lubrication) or an oil mist lubricant is supplied. If the rust preventive oil remains unremoved from the bearing, the lubricating performance will be adversely affected, and therefore a problem will arise that heat may evolve in the bearing. For this reason, the rust preventive oil is necessarily required to be cleansed.

There has been also suggested a method of storing a bearing, in which the bearing is sealed within a gas barrier bag with a rust inhibiting bag of a kind, in which a composition containing an unsaturated chlorinated aliphatic compound and a catalyst is wrapped with a gas permeable packaging material. (See, for example, the Patent Document 2.)

As a rust preventive packaging method for a general merchandise, a rust preventive packaging method has been suggested, in which the merchandise is packaged in a usual polyethylene bag together with a rust preventive polyethylene sheet impregnated with a vaporizable rust preventive agent. (See, for example, the Patent Document 3.)

Patent Document 1: Japanese Laid-open Patent Publication No. 2003-176832
Patent Document 2: Japanese Patent No. 3028966
Patent Document 3: Japanese Laid-open Patent Publication No. 2003-312748

In the conventional method in which the rust preventive oil is applied to the bearing, since the cleansing of the bearing is required in order to remove the rust preventive oil, problems have been recognized that the use of a cleaning apparatus is necessary, control of dusts and grit contained in a cleansing liquid is required, disposal management of the cleansing oil is also required, a substantial length of time is required to accomplish the cleaning, and the workability is extremely low. In particular, the problems associated with the use of the cleansing oil and waste oil are cumbersome in recent years in the face of improvement in the working environment and reduction of environmental loading and, therefore, it is generally felt that the cleansing oil should not be used.

Also, considering that the bearing for the support of the machine tool spindle is used in a high speed environment, increase of the lubricating performance is keenly necessary. In addition, where the cleansing process such as described hereinabove is required in the site of a customer such as, for example, a machine tool manufacturer, there may be a problem in that control of the cleansing level will affect the lubricating performance.

In view of the foregoing, if the bearing were to be used without being cleansed and in the form readily used as removed from the package, the foregoing problems would no longer be moot and the bearing would be a environmentally friendly product.

The method, in which the bearing is sealed within the gas barrier bag together with the rust preventive bag requires the concurrent use of the rust preventive bag and is therefore time-consuming and, if one fails to enclose the rust preventive bag within the gas barrier bag, no rust preventive property will be available.

DISCLOSURE OF THE INVENTION

An object of the present invention is to provide a rust preventive package containing a bearing used in a machine tool, which is free from occurrence of rusting while the bearing is packaged, which allows the bearing to be readily used in practice as removed from the package, and which does not require a time-consuming work in packaging, and also to provide a rust preventive packaging method.

The rust preventive package of the present invention for use with a bearing used in a machine tool is characterized in that the bearing for the machine tool, which is allowed a bearing oil to be applied, is wrapped with a vaporizable rust preventive sheet. The vaporizable rust preventive sheet, a sheet such as, for example, a polymer film, is prepared with a vaporizable rust preventive agent through kneading, impregnating or coating process.

When the bearing is wrapped with the vaporizable rust preventive sheet, the rust preventive agent vaporizes, or dissolves into an incoming moisture, to form a film of the rust preventive agent on a metallic surface of the bearing to thereby exhibit a rust preventive effect. The film of the rust preventive agent so formed on the metallic surface does not affect a lubricant such as, for example, a lubricant oil. Because of this, immediately after the bearing has been removed from the package, the bearing can be readily used in practice without being cleansed. Since it is sufficient to wrap the bearing with the vaporizable rust preventive sheet and there is no need to enclose additionally, for example, the rust preventive agent, the wrapping work can easily be accomplished and there is no possibility of occurrence of rusting which would otherwise occur when the rust preventive agent is left unenclosed.

Further, since the bearing for the machine tool is wrapped after having been allowed a bearing oil to be applied, an undesirable occurrence of rusting in the bearing can be avoided assuredly in the wrapped condition. In the case of using, as the bearing oil, a lubricant oil of a kind that is used when the bearing for the machine tool is operated, the lubricant oil applied during the wrapping can be also used for lubrication of the bearing during the use of the bearing.

Although depending on the machine tool manufacturer, which is a customer purchasing the bearing, and/or the manner of use, a different lubricant oil may be used, in such case a particular lubricant oil is selected, based on information on the lubricant oil used for the bearing, which information is acquired from the customer, and used in the bearing to be wrapped. Alternatively, in order to enable a lubricant oil, different from that actually used, to be used, a mineral bearing oil of a low viscosity (within the range of VG 2 to VG 10 according to the ISO Standards) can be used.

In the present invention, the bearing for the machine tool referred to above may be a precision bearing subjected to lubrication with a slight amount of lubricant, which is represented by, for example, an air oil lubrication or an oil mist circulation.

In the case of the precision bearing lubricated with a slight amount of lubricant, the property of the lubricant oil remaining on rolling surfaces and rolling elements of the bearing will greatly affect the lubricating performance. Because of this, a high degree of cleansing is required where the rust preventive oil is applied in the manner hitherto practiced, and the cleansing work tends to become cumbersome. Accordingly, improvement in the efficiency resulting from the fact that the bearing can readily be used immediately after unwrapping is achieved by the use of the vaporizable rust preventive sheet.

A rust preventive packaging method for the bearing for the machine tool according to the present invention is characterized in that the bearing for the machine tool is allowed a bearing oil to be applied and the bearing is then wrapped with a vaporizable rust preventive sheet.

According to this method, as described in connection with the rust preventive package containing the bearing according to the present invention, there is no problem associated with occurrence of rusting while the bearing is in a wrapped condition and the bearing can readily be used in practice in the form as removed from the package.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1A:
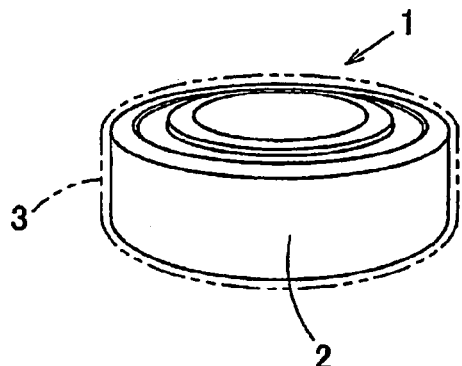
FIG. 1A is a perspective view showing a content of a rust preventive package containing a bearing used in a machine tool in accordance with a preferred embodiment of the present invention.
Figure 1B:
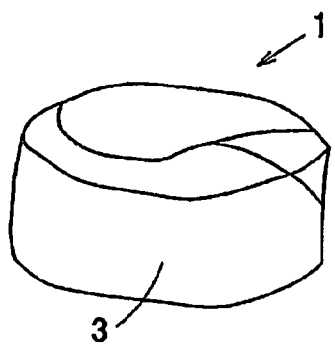
FIG. 1B is a perspective view showing the appearance of a package thereof.
Figure 1C:
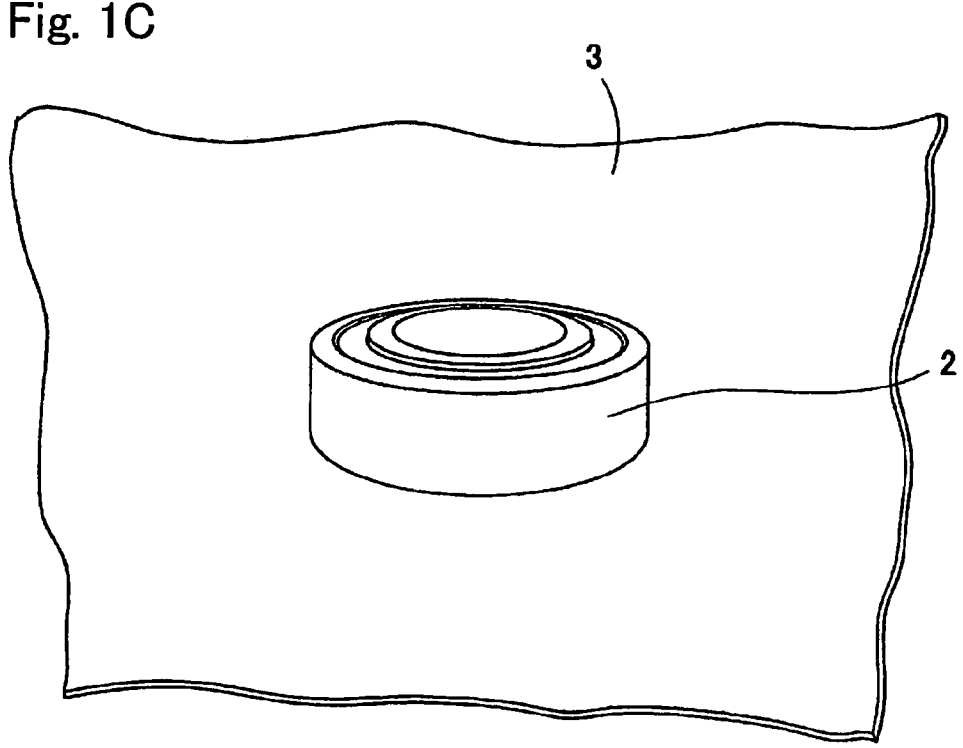
FIG. 1C is a perspective view showing the package unwrapped.

A first preferred embodiment of the present invention will be described with particular reference to FIGS. 1 and 2. As shown in FIG. 1A, a rust preventive package 1 contains a bearing 2 for a machine tool wrapped with a vaporizable rust preventive sheet 3. Wrapping of the bearing 2 for the machine tool with the vaporizable rust preventive sheet 3, for example, is carried out by first placing the bearing 2 for the machine tool on the vaporizable rust preventive sheet 3 which has been spread as shown in FIG. 1C and then folding the vaporizable rust preventive sheet 3 to wrap the bearing 2 tightly with no gap formed between the vaporizable rust preventive sheet 3 and the bearing 2 as shown in FIG. 1B. This wrapping may be carried out in such a manner that while the vaporizable rust preventive sheet 3 is of a sufficient size in consideration of the size of the bearing 2 for the machine tool, the vaporizable rust preventive sheet 3 is folded to wrap the bearing 2 with a plurality of layers.

Figure 3:
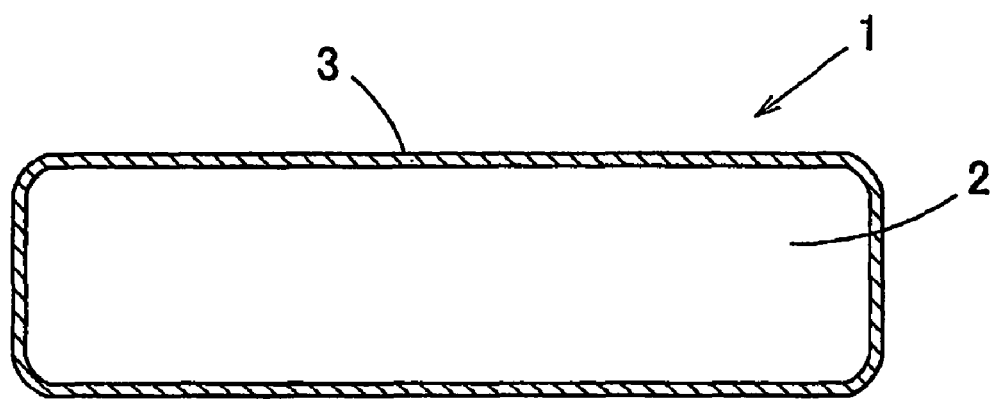
FIG. 3 is a sectional view of the rust preventive package containing the bearing for the machine tool according to another preferred embodiment of the present invention, with the sheet, with the content removed.

Alternatively, wrapping may be carried out by tightly wrapping the bearing 2 for the machine tool with the vaporizable rust preventive sheet 3 and then sealing the sheet with a heat seal or the like as shown in FIG. 3.

In either cases, the rust preventive package 1 of the bearing 2 for the machine tool, in which the bearing 2 is wrapped with the vaporizable rust preventive sheet 3, is placed inside and stored in a box of, for example, cardboard (not shown) for subsequent transportation.

Figure 2:
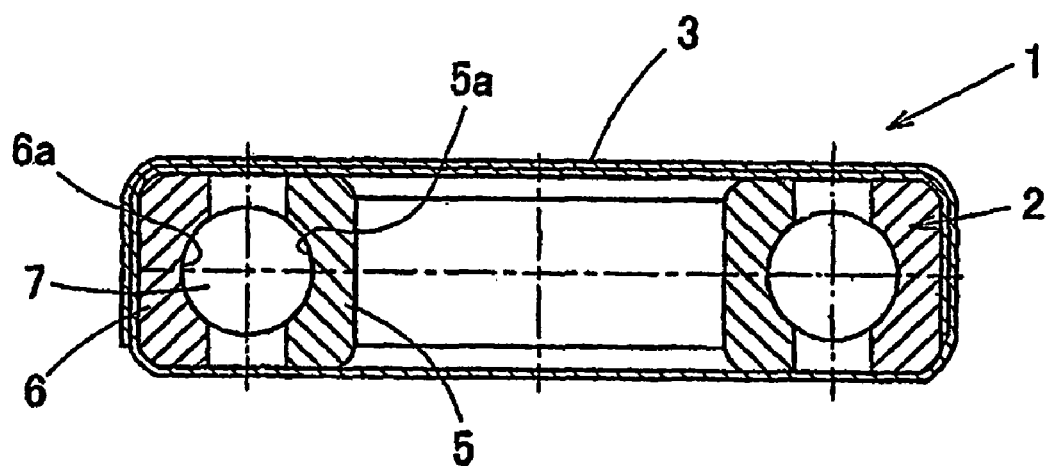
FIG. 2 is a sectional view of the rust preventive package containing the bearing for the machine tool.

The bearing 2 for the machine tool may not be specifically limited to any type, size and shape, but it may be, for example, a deep groove ball bearing as shown in FIG. 2. The bearing 2 for the machine tool shown therein includes a plurality of rolling elements 7 in the form of a ball interposed between rolling surfaces 5a and 6a defined respectively in the inner and outer rings 5 and 6. The rolling elements 7 may be retained within respective pockets defined in a ring shaped retainer at a location circumferentially thereof. Each of the inner ring 5, the outer ring 6 and the rolling elements 7 is made of a bearing steel or the like.

This bearing 2 for the machine tool may be a precision bearing subjected to lubrication with a slight amount of lubricant, which is represented by, for example, an air oil lubrication or an oil mist circulation. The air oil lubrication referred to above is carried out with a transport air containing oil in an atomized state.

Also, the bearing 2 is allowed a bearing oil to be applied. As the bearing oil, a lubricant oil that is used when the bearing 2 is operated is preferably employed.

The vaporizable rust preventive sheet 3 is a polymer film such as, for example, a polyethylene film allowed a vaporizable rust preventive agent to be contained through a kneading, impregnating or coating process.

In the case of the vaporizable rust preventive sheet 3 containing the vaporizable rust preventive agent obtained by means of the kneading process, the vaporizable rust preventive sheet of a kind that can be used with no distinction between front and back surfaces may be available and the wrapping work can be facilitated. Also, in the case of the vaporizable rust preventive sheet 3 utilizing a polyethylene film, it may retain a flexible property peculiar to the polyethylene film and can exhibit an excellent wrapping workability.

The vaporizable rust preventive sheet 3 may be of a type utilizing an ethylene-based resin, generally used as a heat sealing material, for the polymer film, or of a type utilizing a laminated film made up of a plurality of kinds of polymer films or a combination of a polymer film and a paper. The vaporizable rust preventive sheet 3 may be a stretch film. Also, the vaporizable rust preventive sheet 3 may be a film laminated with aluminum foil or foils.

The vaporizable rust preventive agent that can be used in the vaporizable rust preventive sheet 3 may not be specifically limited to a particular type, provided that it can evaporate or sublimate at a room temperature and exhibit a rust preventive effect. By way of example, the vaporizable rust preventive agent may include an organic carboxylic acid amine salt, a nitrous acid amine salt, a phosphoric acid amine salt, a carbonic acid amine salt, or a heterocyclic amine such as, for example, benzotriazole or 3-amino-1,2,4-triazole. These substances can be used singly or in combination.

For this type of vaporizable rust preventive sheet 3, various types are available as a sheet for rust preventive wrapping of automobile or mechanical component parts and one of them can be used. By way of example, a commercially available sheet sold under a trade name "BOSELON" (available from Aicello Chemical Co., Ltd.) or a commercially available sheet sold under a trade name "ZERUST" (available from Taiyo Petroleum Gas Co., Ltd.) can be suitably employed. Any of those "BOSELON" and "ZERUST" sheets are a polyethylene film having a rust preventive function.

According to the rust preventive package 1 of the structure described hereinbefore, since the bearing 2 is wrapped with the vaporizable rust preventive sheet 3, the rust preventive agent contained in the vaporizable rust preventive sheet evaporates, or dissolves into an intruding moisture, to form a film (not shown) of the rust preventive agent on a metallic surface of the bearing 2 and thereby exhibits a rust preventive effect. For example, the evaporated rust preventive agent is ionized to adsorb to anodes or cathodes on the metallic surface to thereby form a molecular film. This rust preventive molecular film is effective to intercept an electrolyte such as, for example, water, and also to suppress an oxidization at the anodes and a reduction at the cathodes simultaneously. Therefore, corrosion of the metal can be suppressed. The film of the rust preventive agent present on the metallic surface does not affect any lubricant such as, for example, a lubricating oil and/or grease. Because of this, immediately after the bearing has been removed from the package, it can be readily used in practice without being cleansed.

Bearings Tested:
Deep groove ball bearing (Nominal Number: 6007P4) and
Angular contact ball bearing (Nominal Number: 7206CP5)

Environmental Conditions (within the thermo-hygrostat bath):

| Temperature: | 40° C. |
|---|---|
| Humidity: | 90% |

Rust Preventing Conditions:
Usual cleansing followed by immersion in a bearing oil (containing a cleansing liquid in a concentration of 15% (*)) and then followed by wrapping.
(*): The cleansing liquid was contained for the purpose of ascertaining whether or not inclusion of the cleansing liquid, deposited on the bearings, in the bath of the bearing oil will affect the rust preventing capability when the bearings are immersed in a spindle oil after the cleansing in practice.)

Wrapping Conditions:
I. After each bearing had been wrapped with the rust preventive wrapping material (the vaporizable rust preventive sheet), it was wrapped with a wrapping film (a polyethylene film).
II. Each bearing was wrapped with only the rust preventive wrapping material (the vaporizable rust preventive sheet).
(To avoid a double wrapping that takes a lot of time and labor, and to examine the effect solely with the vaporizable rust preventive sheet.)

Testing Period:
Eight (8) months.

Test Results:
Under any of those conditions, no rusting was observed in the bearing surfaces, rolling surfaces and rolling elements.
Neither deterioration nor water absorption was found in the bearing oil deposited on the surfaces.
It is to be noted that even as a result of a parallel conducted test, in which the bearings tested were allowed to stand in a warehouse, no rusting was observed under the wrapping test conditions discussed above.

In contrast thereto, where each bearing was allowed the bearing oil to be applied and was then wrapped with the wrapping film (non-rust-preventive film), rusting was observed in one month subsequent to the wrapping.

As can readily be understood from the foregoing test results, when the bearing 2 for the machine tool is allowed a bearing oil to be applied and is then wrapped with the vaporizable rust preventive sheet 3, the problem associated with occurrence of rusting in the bearing 2 can be eliminated even without the rust preventive agent or bag additionally enclosed in the package.

What is claimed is:

1. A rust preventive package to contain a bearing used for a machine tool, comprising:
   a bearing oil which consists of a mineral bearing oil of a low viscosity within the range of VG 2 to VG 10 according to the ISO Standards, adapted to be used regardless of a manufacturer and the brand of the bearing oil, the bearing oil covering the entire surface of the bearing; and
   Wherein the bearing oil is a lubricant oil which is used when the bearing is operated; and
   a vaporizable rust preventive sheet wrapped around the bearing.

2. The rust preventive package according to claim 1, wherein the vaporizable rust preventive sheet comprises a polyethylene film containing a vaporizable rust preventive agent, the vaporizable rust preventive agent being selected from the group consisting of an organic carboxylic acid amine salt, a nitrous acid amine salt, a phosphoric acid amine salt, a carbonic acid amine salt, and a heterocyclic amine.

3. The rust preventive package according to claim 1, wherein the bearing oil is applied by an air oil lubrication or an oil mist circulation.

4. A method of packaging a bearing used in a machine tool, comprising:
   applying a bearing oil which consists of a mineral bearing oil of a low viscosity within the range of VG 2 to VG 10 according to the ISO Standards, adapted to be used regardless of a manufacturer and the brand of the bearing oil, the bearing oil covering the entire surface of the bearing; and Wherein the bearing oil is a lubricant oil which is used when the bearing is operated; and wrapping a vaporizable rust preventive sheet around the bearing.

5. The method according to claim 4, wherein the vaporizable rust preventive sheet comprises a polyethylene film containing a vaporizable rust preventive agent, the vaporizable rust preventive agent being selected from the group consisting of an organic carboxylic acid amine salt, a nitrous acid amine salt, a phosphoric acid amine salt, a carbonic acid amine salt, and a heterocyclic amine.

6. The method according to claim 4, wherein applying bearing oil comprises an air oil lubrication or an oil mist circulation.

7. The method according to claim 4, further comprising heat sealing the vaporizable rust preventive sheet after wrapping the vaporizable rust preventive sheet around the bearing.

8. The rust preventive package according to claim 1, wherein the bearing is a bearing-oil-immersed bearing.

9. The method according to claim 4, wherein the bearing oil is applied by oil immersion.

* * * * *

UNITED STATES PATENT AND TRADEMARK OFFICE
CERTIFICATE OF CORRECTION

PATENT NO. : 7,819,246 B2
APPLICATION NO. : 11/795507
DATED : October 26, 2010
INVENTOR(S) : Hiroshi Takiuchi et al.

Page 1 of 1

It is certified that error appears in the above-identified patent and that said Letters Patent is hereby corrected as shown below:

Title Page, Item [54], after "AND" delete "AND".

Column 1, line 2 after "AND" delete "AND".

Column 6, Line 49 in Claim 1, delete "Wherein" and insert -- wherein --, therefor.

Column 7, Line 4 in Claim 4, delete "Wherein" and insert -- wherein --, therefor.

Signed and Sealed this
Twelfth Day of April, 2011

David J. Kappos
*Director of the United States Patent and Trademark Office*